United States Patent
Sonnelitter, III et al.

(10) Patent No.: US 12,050,538 B2
(45) Date of Patent: Jul. 30, 2024

(54) CASTOUT HANDLING IN A DISTRIBUTED CACHE TOPOLOGY

(71) Applicant: INTERNATIONAL BUSINESS MACHINES CORPORATION, Armonk, NY (US)

(72) Inventors: Robert J. Sonnelitter, III, Bedford Hills, NY (US); Ekaterina M. Ambroladze, Somers, NY (US); Timothy Bronson, Round Rock, TX (US); Michael A. Blake, Wappingers Falls, NY (US); Tu-An T. Nguyen, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 10 days.

(21) Appl. No.: 17/708,785

(22) Filed: Mar. 30, 2022

(65) Prior Publication Data

US 2023/0315644 A1    Oct. 5, 2023

(51) Int. Cl.
*G06F 12/0891* (2016.01)
*G06F 9/38* (2018.01)
*G06F 12/0811* (2016.01)
*G06F 12/0817* (2016.01)

(52) U.S. Cl.
CPC ........ *G06F 12/0891* (2013.01); *G06F 9/3816* (2013.01); *G06F 12/0811* (2013.01); *G06F 12/0824* (2013.01)

(58) Field of Classification Search
CPC ............... G06F 9/3816; G06F 12/0811; G06F 12/0824; G06F 12/0891
See application file for complete search history.

(56) References Cited

U.S. PATENT DOCUMENTS

| | | | |
|---|---|---|---|
| 5,544,345 A | 8/1996 | Carpenter et al. | |
| 8,312,220 B2 * | 11/2012 | Guthrie | G06F 12/0811 711/E12.043 |
| 9,355,035 B2 | 5/2016 | Goodman et al. | |
| 2010/0185819 A1 * | 7/2010 | Heil | G06F 12/128 711/135 |
| 2010/0235576 A1 * | 9/2010 | Guthrie | G06F 12/127 711/146 |
| 2010/0235577 A1 * | 9/2010 | Guthrie | G06F 12/126 711/E12.024 |
| 2011/0055488 A1 * | 3/2011 | Vishin | G06F 12/0811 711/E12.022 |

(Continued)

OTHER PUBLICATIONS

Aguilar-Saborit et al., POLARIS: The Distributed SQL Engine in Azure Synapse, Microsoft Corp, Proceedings of he VLDB Endowment, vol. 13, Issue 12, DOI: https://doi.org/10.14778/3415478.3415545, dated Aug. 2020, online Sep. 14, 2020, 13 pages.

(Continued)

*Primary Examiner* — Aracelis Ruiz
(74) *Attorney, Agent, or Firm* — Yuanmin Cai

(57) ABSTRACT

Castout handling in a distributed cache topology, including: detecting, by a first cache of a plurality of caches, a cache miss; providing, by the first cache to each other cache of the plurality of caches, a message comprising: data indicating a cache address corresponding to the cache miss; and data indicating a cache line to be evicted.

20 Claims, 7 Drawing Sheets

(56) References Cited

U.S. PATENT DOCUMENTS

2017/0177488 A1\* 6/2017 Leung ................ G06F 12/0842
2020/0371962 A1\* 11/2020 Bhoria ................ G06F 9/30043

OTHER PUBLICATIONS

Anonymous, Graph Aware Caching Policy for Distributed Graph Stores, IBM, An IP.com Prior Art Database Technical Disclosure, IP.com No. IPCOM000240727D, IP.com Electronic Publication Date: Feb. 23, 2015, 6 pages.

Anonymous, Hybrid cache eviction policy for near caches in spatially distributed cache platforms, IBM, An IP.com Prior Art Database Technical Disclosure, IP.com No. IPCOM000234682D, IP.com Electronic Publication Date: Jan. 28, 2014, 4 pages.

Anonymous, Method and Apparatus for Dynamic Cache Bypass and Insertion, IBM, An IP.com Prior Art Database Technical Disclosure, IP.com No. IPCOM000223644D, IP.com Electronic Publication Date: Nov. 20, 2012, 7 pages.

David Raften, Coupling Facility Configuration Options, IBM, ResearchGate, Conference Paper dated Sep. 2013, Positioning Paper Oct. 2016, 84 pages.

David Raften, Coupling Facility Configurations Options (updated Oct. 2016), IBM, ResearchGate, DOI: 10.13140/RG.2.2.12084. 45444, Technical Report Nov. 2016, Positioning Paper Oct. 2016, 84 pages.

\* cited by examiner

CASTOUT HANDLING IN A DISTRIBUTED CACHE TOPOLOGY

BACKGROUND

Field of the Invention

The field of the invention is data processing, or, more specifically, methods, apparatus, and products for castout handling in a distributed cache topology.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

In a distributed cache topology, caches coupled to a given core may be used as a lower level cache for another core. Where a cache miss occurs, these other caches must be accessed to determine if they store the data for the cache miss.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
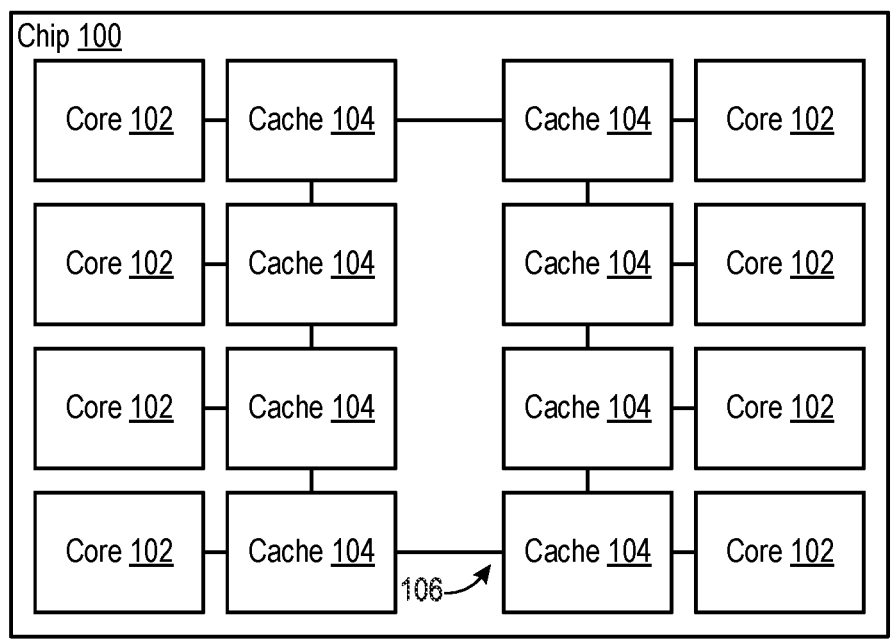
FIG. 1 shows a block diagram of an example chip for castout handling in a distributed cache topology according to some embodiments of the present disclosure.

Exemplary methods, apparatus, and products for castout handling in a distributed cache topology in accordance with the present invention are described with reference to the accompanying drawings, beginning with FIG. 1. FIG. 1 shows an example chip 100 for castout handling in a distributed cache topology according to some embodiments of the present disclosure. The example chip 100 of FIG. 1 may be implemented in a variety of computing devices or apparatuses, including desktop computers, servers, laptops, mobile devices, set-top boxes, and the like. For example, the chip 100 may include a central processing unit (CPU) or another processor as can be appreciated.

The example chip 100 includes multiple cores 102. Each core 102 is a processing unit of the chip 100. For example, the chip 100 may include a single integrated circuit that includes the multiple cores 102. The chip 100 also includes multiple caches 104. Each cache 104 is a portion of memory that provides fast access to data stored therein to a corresponding core 102. As shown, each core 102 is coupled to a corresponding cache 104. In other words, each core 102 is directly coupled to a corresponding cache 104, and each cache 104 is directly coupled to a single corresponding core 102. In some embodiments, each cache 104 serves as a particular level of cache for the corresponding core 102 to which it is coupled (e.g., as an L2 cache).

As shown, the caches 104 are arranged in a ring topology. In this ring topology, each cache 104 taps or is coupled to a ring bus 106 that provides data communications to each cache 104. The ring bus 106 is a bus for data communication between caches 104 fashioned in a ring or other continuous fashion. Thus, each cache 104 is able to communicate with each other cache 104 via the ring bus 106. Due to the ring topology, each cache 104 is positioned adjacent to two other caches 104 on the ring bus 106. Although FIG. 1 shows a single ring bus 106, one skilled in the art will appreciate that this is merely exemplary and that a single ring bus 106 may be shown for clarity. In some embodiments, multiple ring buses 106 of potentially different bandwidths or sizes may be used to communicatively couple the caches 104. As an example, various ring buses 106 may each be used to perform different functions (e.g., castout and cache hit queries, communication of data stored on a cache 104 or to be stored on a cache 104, and the like).

As is set forth above, for a given core 102, the corresponding cache 104 coupled to the core may serve as a particular level of cache 104 (e.g., L2). Each other cache 104 may serve as a lower level cache 104 for that given core 102 (e.g., L3). Accordingly, as a higher level cache 104 may evict cache lines to a lower level cache 104, each cache 104 may be configured to evict cache lines to any other cache 104. Similarly, each cache 104 may receive evicted cache lines from any other cache 104. One skilled in the art will appreciate that the eviction of cache lines between caches 104 may be subject to various restrictions or policies that may affect which caches 104 may receive evicted cache lines under various operational conditions.

Figure 2:
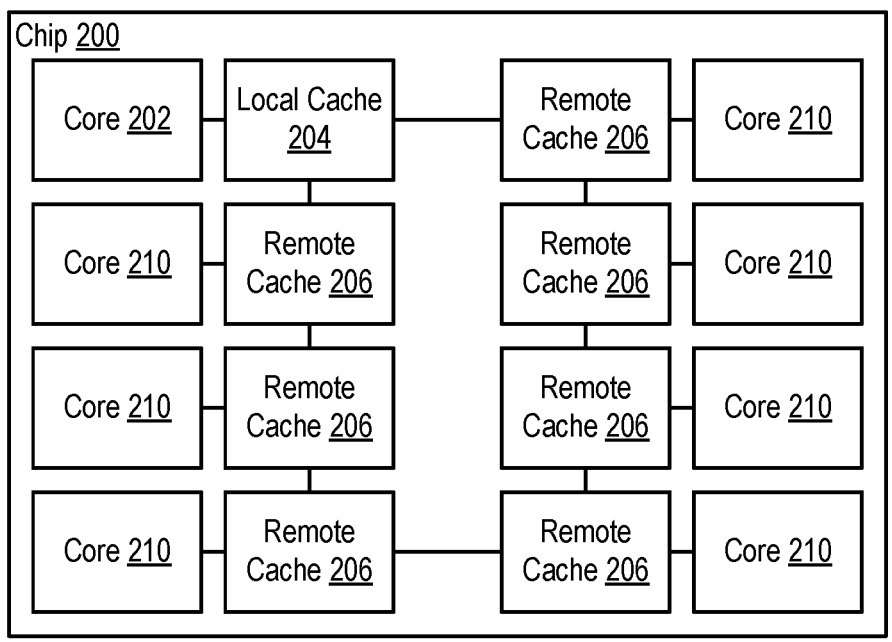
FIG. 2 shows a block diagram of an example chip for castout handling in a distributed cache topology according to some embodiments of the present disclosure.

To further explain castout handling in a distributed cache topology according to some embodiments of the present disclosure, FIG. 2 shows another example chip 200. The example chip 200 is an alternate view of the chip 100 with different labels so as to describe castout handling in a distributed cache topology from with respect to a particular core 202 and its corresponding local cache 204. The local cache 204 is the cache 104 that is coupled to the core 202. As an example, the local cache 204 may serve as an L2 cache for the core 202. Each other cache 104 on the chip 200 serves as a remote cache 206 with respect to the core 202. As shown, each remote cache 206 is not directly coupled to the local cache 202, but taps the same ring bus(es) 106 as the local cache 204. For example, each remote cache 206 may serve as an L3 cache relative to the cache 202. One skilled in the art will appreciate that, from the perspective of other cores 210, the local cache 204 of the core 202 would functionally operate as a remote cache 206 for the other cores 210.

As the core 202 services memory operations to load or store data, the core 202 may access the local cache 204 to determine if an affected area of memory is reflected in the local cache 204. For example, the core 202 may determine that, for a particular memory address targeted by a memory operation, corresponding data is not stored in some on-core cache (e.g., an L1 cache) and therefore queries the local cache 204 to determine if the data is stored on the local cache 204. As an example, the core 202 may submit a query or request to a controller of the local cache 204 to determine if the data is stored in the local cache 204. The request may then cause the local cache 204 to perform a lookup to determine if the data for the memory operation is stored in the local cache 204.

Where the data is stored in the local cache 204, the core 202 may access the data from the local cache 204 in order to perform the memory operation. As the data was stored in the local cache 204, this is considered a "cache hit." Where the data was not stored in the local cache 204, this is considered a "cache miss." In response to a cache miss 204, the local cache 204 may evict some cache line of the local cache 204 to a remote cache 206, thereby freeing a cache line in local cache 204. Further in response to the cache miss 204, the local cache 204 may load the data into the freed cache line. In some embodiments, the evicted cache line (hereinafter referred to as a "castout") may be received by a remote cache 206 and stored in the remote cache 206. For example, where no other remote cache 206 is storing the castout, the local cache 204 may evict the castout to a remote cache 206 for storage.

Where the data is stored in a remote cache 206, the local cache 204 may access the data from a remote cache 206 faster than accessing from an even lower (e.g., L4) cache or from main memory. Accordingly, in response to the cache miss, the local cache 204 may also query each remote cache 206 to determine if the data for the memory operation is stored in a remote cache 206.

In existing solutions, in the event of a cache miss for the local cache 204, the local cache 204 would need to query each remote cache 206 to determine if the data for the memory operation is stored in a remote cache 206 and separately query each remote cache 206 to determine if they are able to receive a castout from the local cache 204. Thus, each remote cache 206 must perform two directory lookups (e.g., one for checking for the data for the memory operation and one for determining if the castout may be received).

Instead, the local cache 204 provides (e.g., via a ring bus 106) a message that indicates both the cache address corresponding to the cache miss (e.g., the cache address targeted by the memory operation) and also indicates a cache line to be evicted by the local cache 204. The message is sent as a single bus transaction, with both the cache address corresponding to the cache miss and the cache line to be evicted being provided via this single bus transaction. Thus, each receiving remote cache 206 may use the message to determine whether they have a cache hit for the cache address and to determine if they may accept the castout (e.g., the cache line to be evicted) using a single directory lookup by that remote cache 206.

Figure 3:
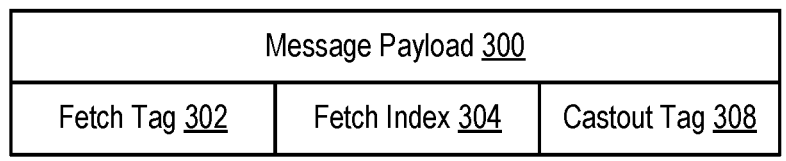
FIG. 3 an example encoding of a request payload for castout handling in a distributed cache topology according to some embodiments of the present disclosure.

As would be appreciated by one skilled in the art, a cache address may be expressed using a tag, an index, and an offset. The tag is a unique identifier for a group of data that differentiates different regions of memory that may be mapped to a block. The index identifies a particular set or grouping of lines in the cache. The offset identifies a particular block. Accordingly, as shown in FIG. 3, the message may include a message payload 300. The message payload 300 includes a fetch tag 302 and fetch index 304, the tag and index of the cache address subject to the cache miss.

The message also includes a castout tag 308. The castout (e.g., the cache line to be evicted by the local cache 204) may also be expressed as a tag and index. Accordingly, the castout tag 308 is the tag of the cache line to be evicted. In the event of a cache miss, the local cache 204 selects, for eviction, a cache line having a same index as the cache address of the cache miss. Thus, the index of the castout is the same as the fetch index 304. Accordingly, a remote cache 206 receiving the message payload 300 may determine if the castout may be received or if the castout is stored on the remote cache 206 using the fetch index 304 and the castout tag 308. The use of a shared index allows a single directory lookup on remote caches to determine response information for both the fetch miss and the castout.

Turning back to FIG. 2, each remote cache 206 receiving the message payload 300 will provide a response to the local cache 204. The response includes a cache hit indicator, an attribute or value indicating whether or not the cache address (e.g., a fetch address including the fetch tag 302 and fetch index 304) in the message payload 300 is stored on the receiving remote cache 206. The response also includes a castout receivable indicator, an attribute or value indicating whether or not the remote cache 206 is able to receive the castout. In some embodiments, the response may also include (e.g., as the castout receivable indicator or as another attribute or value) an indication of whether the remote cache 206 is storing an instance of the castout. Thus, each remote cache 206 may provide a single response that indicates whether or not the remote cache 206 has a cache hit and whether or not the remote cache 206 can receive the castout. One skilled in the art will appreciate that a given remote cache 206 may employ a variety of rules, metrics, algorithms, and the like in order to determine their capability to receive a castout based on various attributes such as cache activity, cache utilization, and the like. Accordingly, such rules, metrics, and algorithms may be adjusted and configured based on design considerations.

The local cache 204 receives the responses from the remote caches 206 and may perform various operations based on the responses. For example, where a response from a given remote cache 206 indicates a cache hit, the local cache 204 may load, from the given remote cache 206, the hit cache line. After evicting the castout, the loaded cache line may be stored in the local cache 204. Accordingly, the local cache 204 may also perform a cache line eviction based on the responses. For example, where a given remote cache 206 indicates that it may accept the castout, the local cache 204 may evict the castout to the given remote cache 206 for storage. As another example, where a given remote cache 206 indicates that it stores a copy of the castout, the local cache 204 may evict (e.g., delete) the castout without additional storage of the castout on another remote cache 206.

Castout handling in a distributed cache topology in accordance with the present application is generally implemented with computers, that is, with automated computing machinery. For further explanation, therefore, FIG. 4 sets forth a block diagram of computing machinery including an exemplary computer 400 configured for castout handling in a distributed cache topology according to certain embodiments. The computer 400 of FIG. 4 includes at least one computer processor 402 or 'CPU' as well as random access memory 404 ('RAM') which is connected through a high speed memory bus 406 and bus adapter 408 to processor 402 and to other components of the computer 400.

Stored in RAM 404 is an operating system 410. Operating systems useful in computers configured for castout handling in a distributed cache topology according to certain embodiments include UNIX™, Linux™, Microsoft Windows™, and others as will occur to those of skill in the art. The operating system 410 in the example of FIG. 4 is shown in RAM 404, but many components of such software typically are stored in non-volatile memory also, such as, for example, on data storage 412, such as a disk drive.

Figure 4:
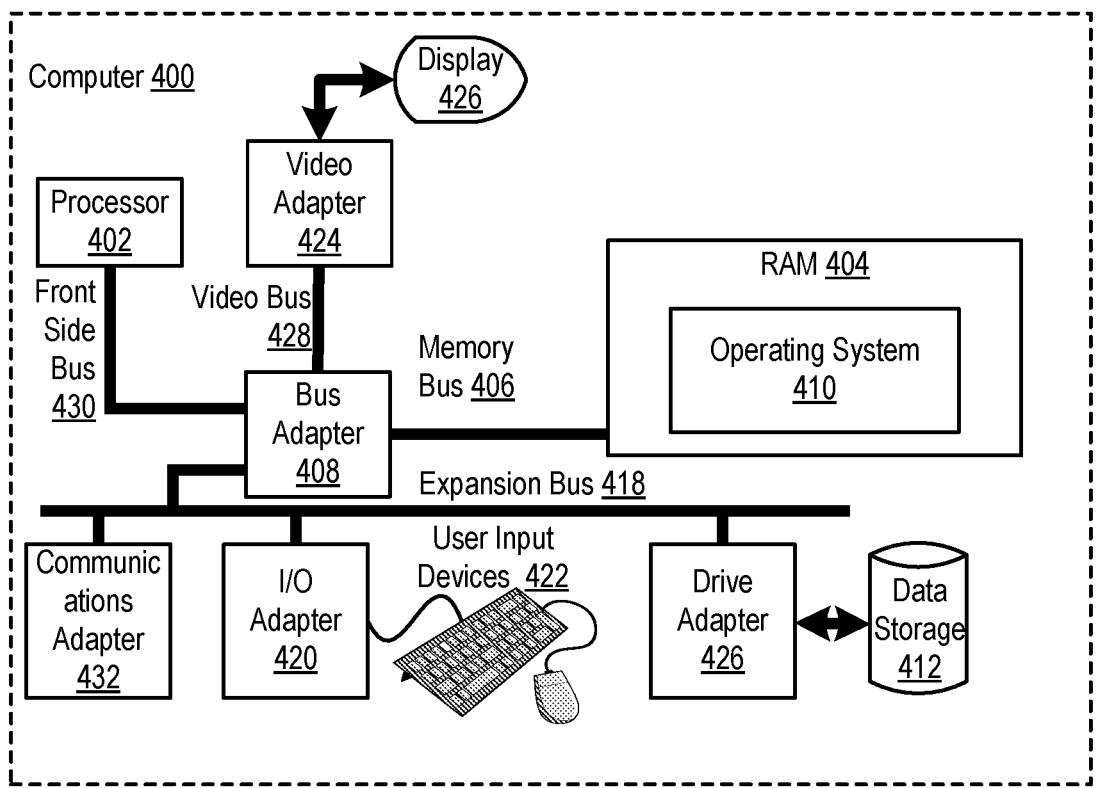
FIG. 4 shows a block diagram of an example computer for castout handling in a distributed cache topology according to some embodiments of the present disclosure.

The computer 400 of FIG. 4 includes disk drive adapter 416 coupled through expansion bus 418 and bus adapter 408 to processor 402 and other components of the computer 400. Disk drive adapter 416 connects non-volatile data storage to the computer 400 in the form of data storage 412. Disk drive adapters useful in computers configured for castout handling in a distributed cache topology according to certain embodiments include Integrated Drive Electronics ('IDE') adapters, Small Computer System Interface ('SCSI') adapters, and others as will occur to those of skill in the art. In some embodiments, non-volatile computer memory is implemented as an optical disk drive, electrically erasable programmable read-only memory (so-called 'EEPROM' or 'Flash' memory), RAM drives, and so on, as will occur to those of skill in the art.

The example computer 400 of FIG. 4 includes one or more input/output ('I/O') adapters 420. I/O adapters implement user-oriented input/output through, for example, software drivers and computer hardware for controlling output to display devices such as computer display screens, as well as user input from user input devices 422 such as keyboards and mice. The example computer 400 of FIG. 4 includes a video adapter 424, which is an example of an I/O adapter specially designed for graphic output to a display device 426 such as a display screen or computer monitor. Video adapter 424 is connected to processor 402 through a high speed video bus 428, bus adapter 408, and the front side bus 430, which is also a high speed bus.

The exemplary computer 400 of FIG. 4 includes a communications adapter 432 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters implement the hardware level of data communications through which one computer sends data communications to another computer, directly or through a data communications network. Examples of communications adapters useful in computers configured for castout handling in a distributed cache topology according to certain embodiments include modems for wired dial-up communications, Ethernet (IEEE 802.3) adapters for wired data communications, and 802.11 adapters for wireless data communications.

Figure 5:
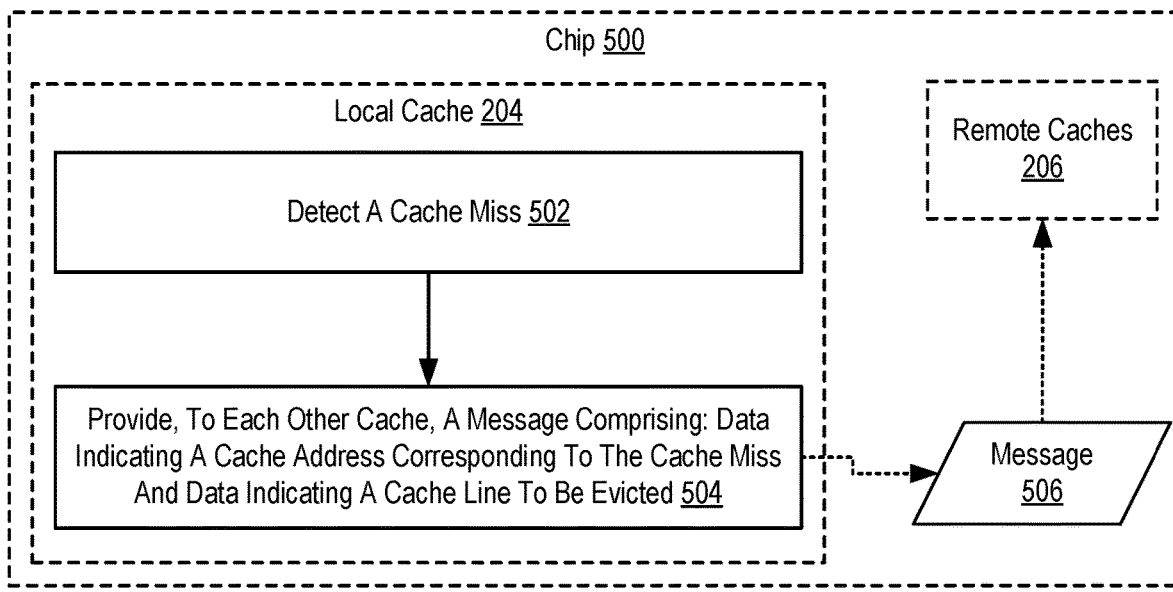
FIG. 5 shows a flowchart of an example method for castout handling in a distributed cache topology according to some embodiments of the present disclosure.

For further explanation, FIG. 5 shows a flowchart of an example method for castout handling in a distributed cache topology according to some embodiments of the present disclosure. The method of FIG. 5 may be implemented, by a chip 500 (e.g., similar to chips 100, 200 described above). The method of FIG. 5 includes detecting 502 (e.g., by a local cache 204) a cache miss. As an example, the local cache 204 may receive (e.g., by a controller from a corresponding core 202) a cache line address indicating a particular portion of data requested by the core 202. The local cache 204 may perform a directory lookup or another operation to determine whether the requested cache line address is stored in the local cache 204. In response to the cache line address not being stored in the local cache 204, a cache miss is detected.

The method of FIG. 5 also includes providing 504 (e.g., by the local cache 204), to each other cache (e.g., to remote caches 206), a message 506 comprising data indicating a cache address corresponding to the cache miss and data indicating a cache line to be evicted. The message 506 is sent to each remote cache 206 using a single bus transaction (e.g., via a ring bus 106). The data indicating the cache address corresponding to the cache miss may include a tag and index for the missed cache address (e.g., a fetch tag 302 and fetch index 304). The data indicating the cache line to be evicted may include, for example, a tag for the cache line to be evicted (e.g., a castout tag 308). As the index of the cache line to be evicted (e.g., a castout) is the same as the fetch index 304, receiving remote caches 206 may determine whether they can accept the castout, or whether the castout is stored on the remote cache 206, using the fetch index 304 and castout tag 308.

Figure 6:
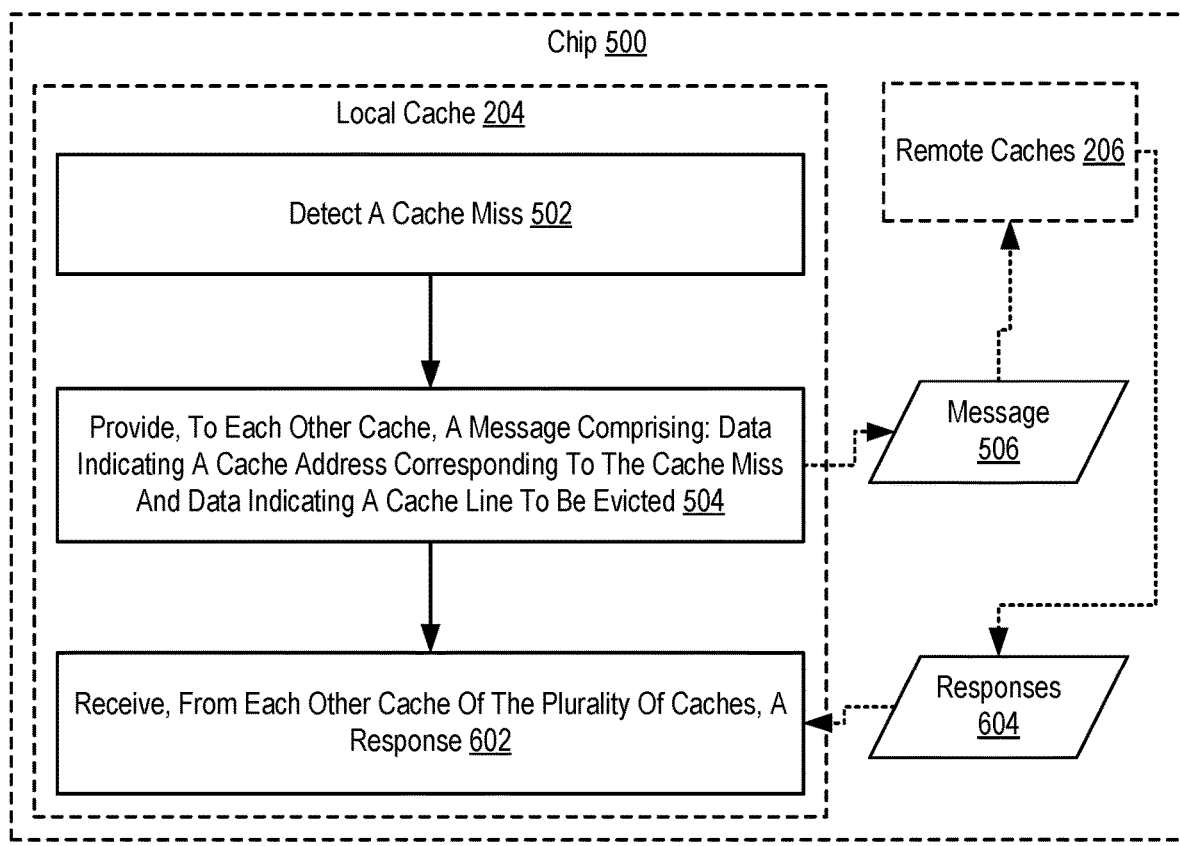
FIG. 6 shows a flowchart of an example method for castout handling in a distributed cache topology according to some embodiments of the present disclosure.

For further explanation, FIG. 6 shows a flowchart of another example method for castout handling in a distributed cache topology according to some embodiments of the present disclosure. The method of FIG. 6 is similar to FIG. 5 in that the method of FIG. 6 includes: detecting 502 (e.g., by a local cache 204) a cache miss; and providing 504, to each other cache (e.g., to remote caches 206), a message 506 comprising data indicating a cache address corresponding to the cache miss and data indicating a cache line to be evicted.

The method of FIG. 6 differs from FIG. 5 in that the method of FIG. 6 includes receiving 602, from each other cache of the plurality of caches (e.g., the remote caches 206), a response 604. The response 604 includes a cache hit indicator, an attribute or value indicating whether or not the cache address (e.g., a fetch address including the fetch tag 302 and fetch index 304) in the message payload 300 is stored on the receiving remote cache 206. The response 604 also includes a castout receivable indicator, an attribute or value indicating whether or not the remote cache 206 is able to receive the castout. In some embodiments, the response 604 may also include (e.g., as the castout receivable indicator or as another attribute or value) an indication of whether the remote cache 206 is storing an instance of the castout. Thus, each remote cache 206 may provide a single response 604 that indicates whether or not the remote cache 206 has a cache hit and whether or not the remote cache 206 can receive the castout. Because the fetch miss address and the castout address share the same index, only one single directory lookup is required at each of the remote caches 206 to generate the fetch response and the castout response contained in responses 604. As will be described in further detail below, the local cache 204 receives the responses 604 from the remote caches 206 and may perform various operations based on the received responses 604. One skilled in the art will appreciate that, in some embodiments, the response 604 may be embodied as a single response 604 or multiple responses 604. For example, separate responses 604 may be used for the fetch and castout commands.

Figure 7:
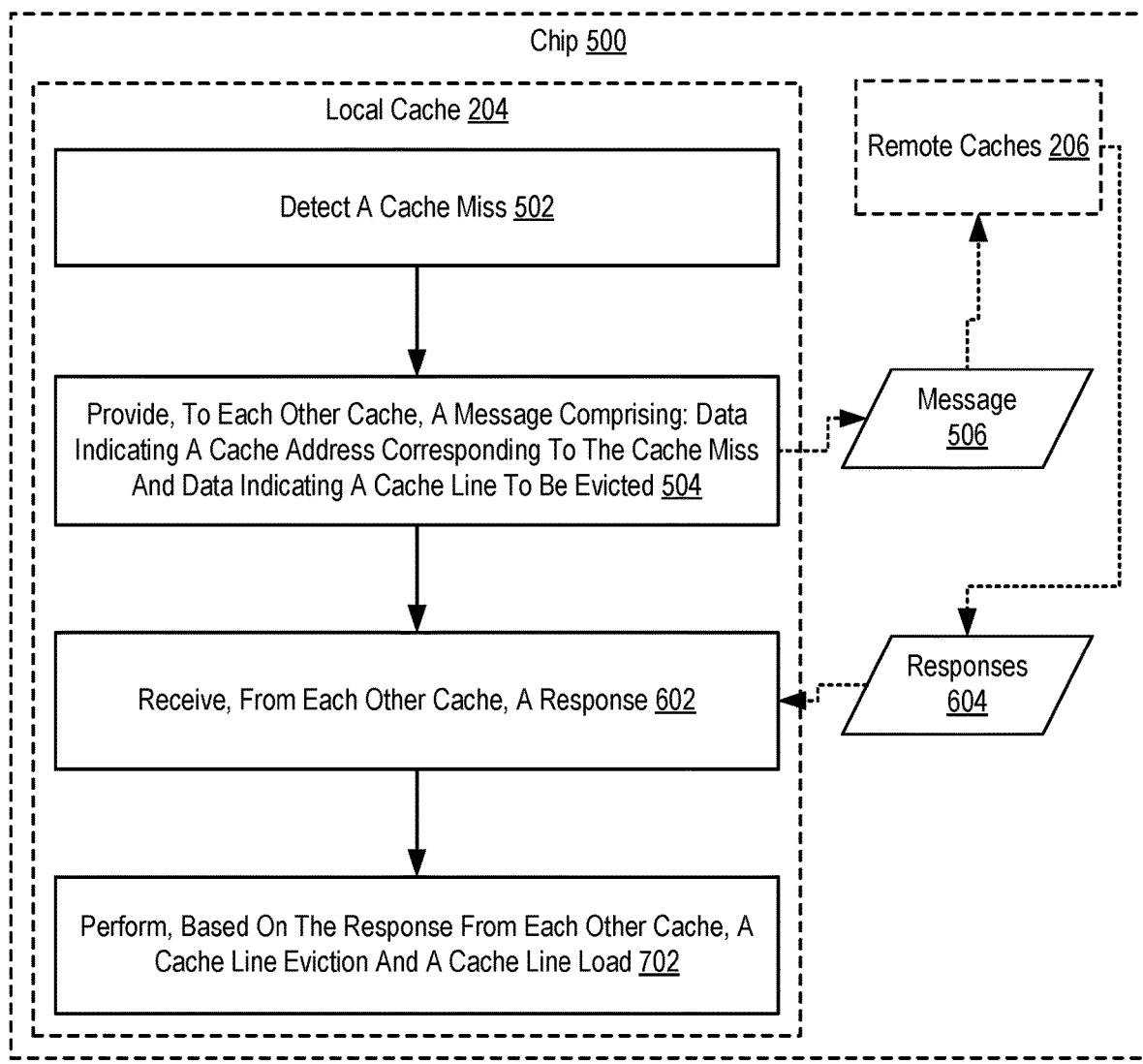
FIG. 7 shows a flowchart of an example method for castout handling in a distributed cache topology according to some embodiments of the present disclosure.

For further explanation, FIG. 7 shows a flowchart of another example method for castout handling in a distributed cache topology according to some embodiments of the present disclosure. The method of FIG. 7 is similar to FIG.

6 in that the method of FIG. 7 includes: detecting 502 (e.g., by a local cache 204) a cache miss; and providing 504, to each other cache (e.g., to remote caches 206), a message 506 comprising data indicating a cache address corresponding to the cache miss and data indicating a cache line to be evicted; and receiving 602, from each other cache of the plurality of caches (e.g., the remote caches 206), a response 604.

The method of FIG. 7 differs from FIG. 6 in that the method of FIG. 7 includes performing 702 (e.g., by the local cache 204), based the response 604 from each other cache (e.g., the remote caches 206), a cache line eviction and a cache line load. Performing the cache line eviction causes the castout (e.g., the cache line selected for eviction) to be removed from the local cache 204. In some embodiments, performing the cache line eviction causes the castout to be stored on a remote cache 206. For example, where a given remote cache 206 indicates, in a response 604, an ability to receive the castout, the local cache 204 may store the castout in the given remote cache 206. In some embodiments, where a response 604 indicates that a copy of the castout is stored on a given remote cache 206, the local cache 204 may delete the castout without performing an additional store of the castout as a copy already exists on a remote cache 206. One skilled in the art will appreciate that the remote cache 206 that receives the castout, or that already contains a copy of the line to be castout, may or may not be the same remote cache 206 that contains the cache line (if any) for the fetch miss 502.

In some embodiments, where a response 604 indicates a cache hit (e.g., the cache address corresponding to the cache miss is stored in a remote cache 206), performing the cache line load includes loading the cache line for the cache address from the remote cache 206 and storing it in the local cache 204. In some embodiments, where no response 604 indicates a cache hit, the data for the cache line may be loaded from memory or a lower level cache and stored in the local cache 204.

In view of the explanations set forth above, readers will recognize that the benefits of castout handling in a distributed cache topology according to embodiments of the present invention include:

Improved performance of a computing system by consolidating requests for lower level cache hits and requests to store castouts into a single message.

Improved performance of a computing system by reducing the number of directory lookups by lower level caches, improving speed and power consumption.

Exemplary embodiments of the present invention are described largely in the context of a fully functional computer system for castout handling in a distributed cache topology. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of castout handling in a distributed cache topology, the method comprising:
   detecting, by a first cache of a plurality of caches, a cache miss;
   providing, by the first cache to each other cache of the plurality of caches, a message comprising:
      data indicating a cache address corresponding to the cache miss; and
      data indicating a cache line to be evicted.

2. The method of claim 1 further comprising receiving, by the first cache and from each other cache of the plurality of caches, a response to the message.

3. The method of claim 2, wherein the response comprises a cache hit indicator and a castout receivable indicator.

4. The method of claim 2, further comprising performing, based on the response from each other cache of the plurality of caches, a cache line eviction and a cache line load.

5. The method of claim 1, wherein the data indicating the cache line to be evicted comprises a tag of the cache line to be evicted.

6. The method of claim 1, wherein the cache address corresponding to the cache miss and the cache line to be evicted share a same index.

7. The method of claim 1, wherein each cache of the plurality of caches is configured to evict to any other cache of the plurality of caches.

8. The method of claim 1, wherein each cache of the plurality of caches is coupled to a corresponding core of a plurality of cores.

9. A chip for castout handling in a distributed cache topology, comprising:
   a plurality of caches, wherein each cache is configured to perform steps comprising:
      detect a cache miss;
      provide, to each other cache of the plurality of caches, a message comprising:
         data indicating a cache address corresponding to the cache miss; and
         data indicating a cache line to be evicted.

10. The chip of claim 9, wherein the steps further comprise receiving, from each other cache of the plurality of caches, a response to the message.

11. The chip of claim 10, wherein the response comprises a cache hit indicator and a castout receivable indicator.

12. The chip of claim 10, wherein the steps further comprise performing, based on the response from each other cache of the plurality of caches, a cache line eviction and a cache line load.

13. The chip of claim 9, wherein the data indicating the cache line to be evicted comprises a tag of the cache line to be evicted.

14. The chip of claim 9, wherein the cache address corresponding to the cache miss and the cache line to be evicted share a same index.

15. The chip of claim 9, wherein each cache of the plurality of caches is configured to evict to any other cache of the plurality of caches.

16. The chip of claim 9, further comprising a plurality of cores, wherein each cache of the plurality of caches is coupled to a corresponding core of a plurality of cores.

17. An apparatus for castout handling in a distributed cache topology, comprising:
    a chip comprising:

a plurality of caches, wherein each cache is configured to perform steps comprising:
    detect a cache miss;
provide, to each other cache of the plurality of caches, a message comprising:
    data indicating a cache address corresponding to the cache miss; and
    data indicating a cache line to be evicted.

18. The apparatus of claim 17, wherein the steps further comprise receiving, from each other cache of the plurality of caches, a response to the message.

19. The apparatus of claim 18, wherein the response comprises a cache hit indicator and a castout receivable indicator.

20. The apparatus of claim 18, wherein the steps further comprise performing, based on the response from each other cache of the plurality of caches, a cache line eviction and a cache line load.

\* \* \* \* \*